(12) United States Patent
Haba et al.

(10) Patent No.: US 6,199,987 B1
(45) Date of Patent: Mar. 13, 2001

(54) OPTICAL DEVICE, AND PROJECTION DISPLAY DEVICE INCLUDING THE SAME

(75) Inventors: Shinji Haba; Takeshi Takizawa, both of Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/247,531

(22) Filed: Feb. 10, 1999

(30) Foreign Application Priority Data

Feb. 25, 1998 (JP) .................................................. 10-062167

(51) Int. Cl.[7] .......................... G03B 21/26; G02F 1/1335; G02B 27/28; F21S 13/10
(52) U.S. Cl. ................................ 353/34; 353/22; 353/24; 353/38; 349/57; 349/58; 349/60; 359/500; 362/367; 362/368
(58) Field of Search ............................... 353/100, 20, 22, 353/24, 38, 119; 349/57, 58, 60; 359/500; 362/367, 368

(56) References Cited

U.S. PATENT DOCUMENTS 5,865,521 * 2/1999 Hashizume et al. .................... 353/38
5,975,704 * 11/1999 Basey .................................... 353/20

* cited by examiner

*Primary Examiner*—Russell Adams
*Assistant Examiner*—Khaled Brown
(74) *Attorney, Agent, or Firm*—Oliff & Berridge, PLC

(57) ABSTRACT

To increase the usage efficiency of the light of optical elements used in a projection display device, a polarizing conversion unit is provided. This polarizing conversion unit consists of a unit frame, two polarizing conversion element arrays, a light-shielding plate, a lens array, and clips. From the side of one open surface of the unit frame, the two polarizing conversion element arrays are inserted, and the light-shielding plate and the lens array are inserted from the side of the other open surface in this order. These optical elements are clamped by four clips from the two directions of up and down in a state of being stored in the unit frame. Since the clips are formed of an elastic body, the clips can be easily attached and detached, and the respective parts of the polarizing conversion unit can also be easily attached and detached to and from the unit frame. In addition, these optical elements may be sequentially inserted from the side of one open surface.

27 Claims, 12 Drawing Sheets

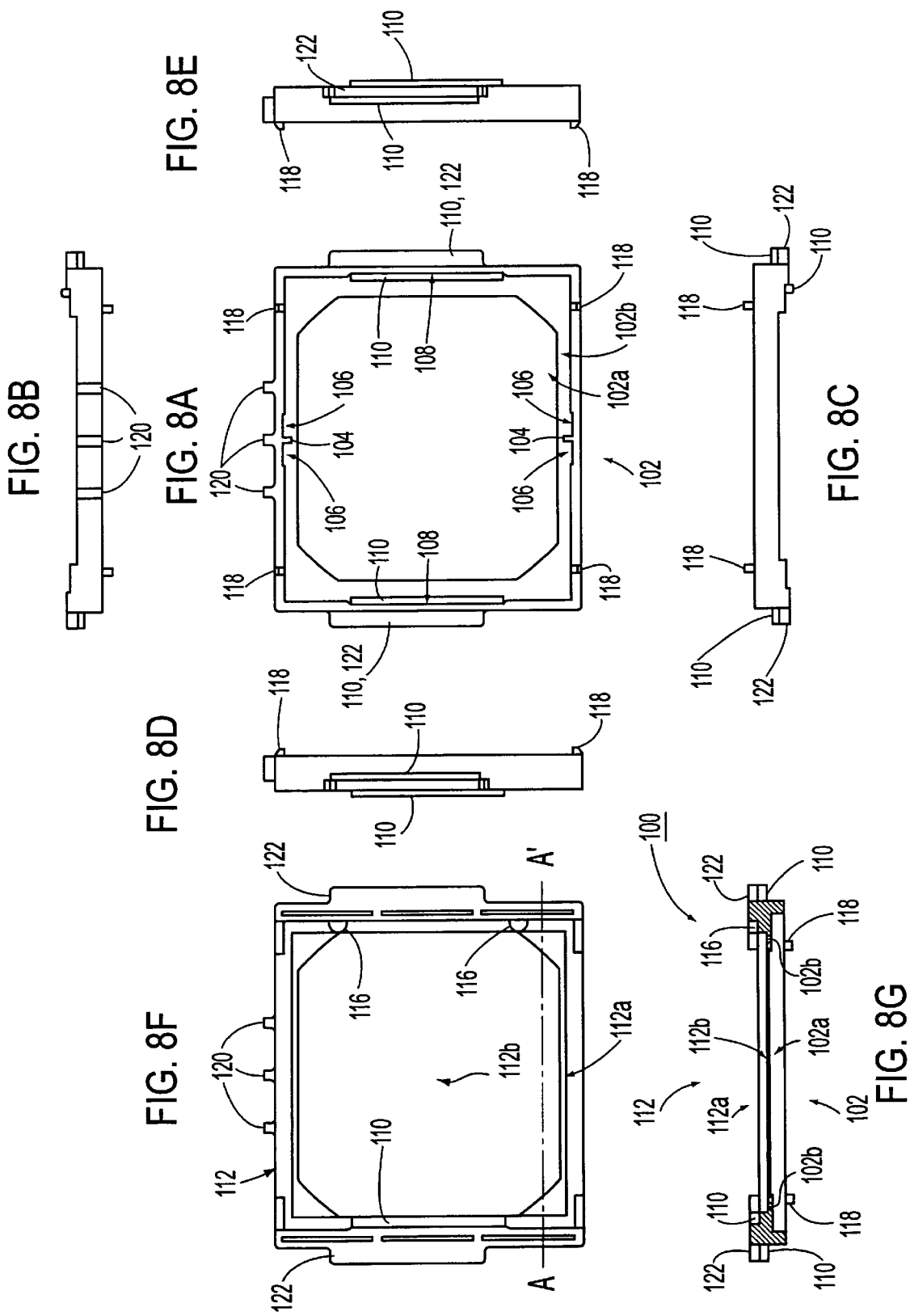

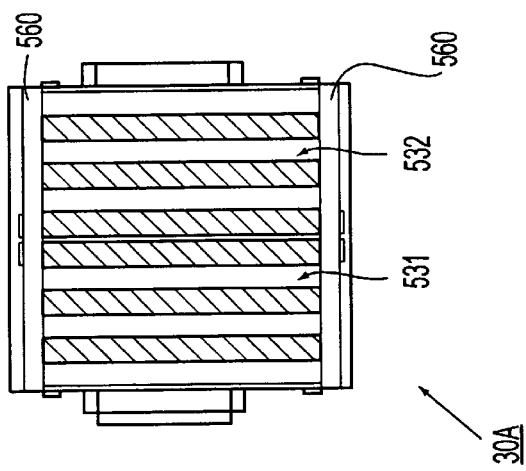
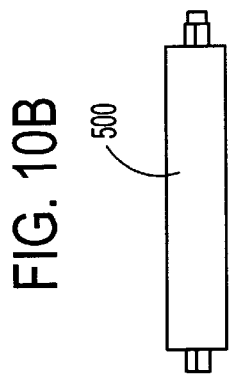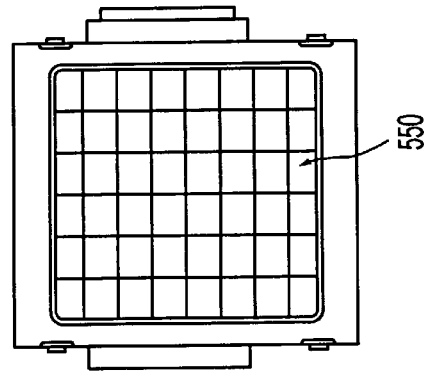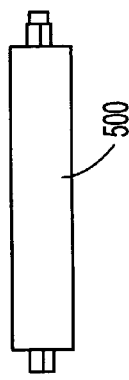
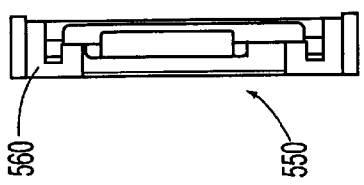
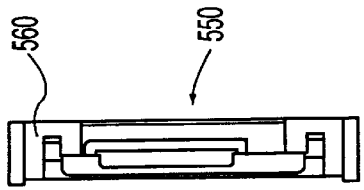

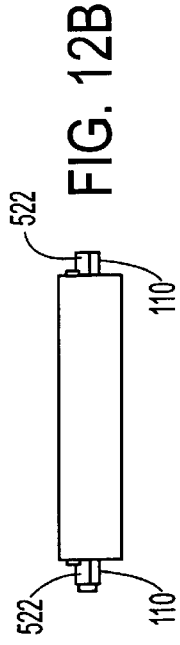
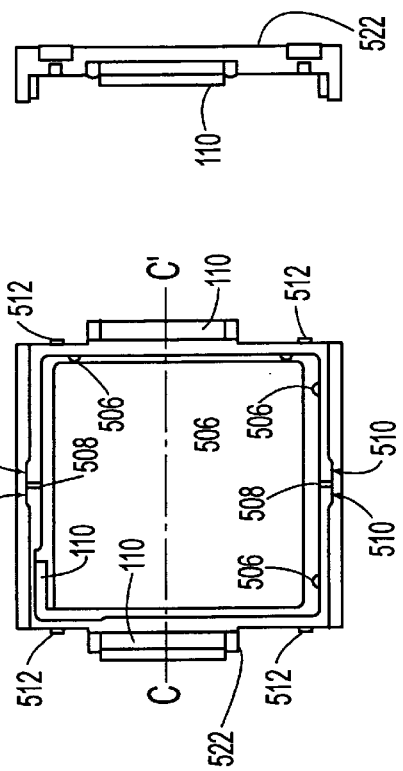
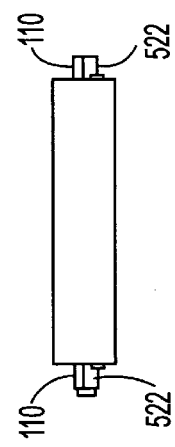
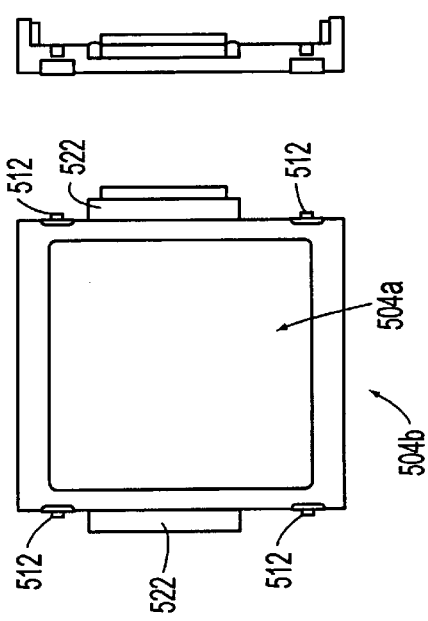
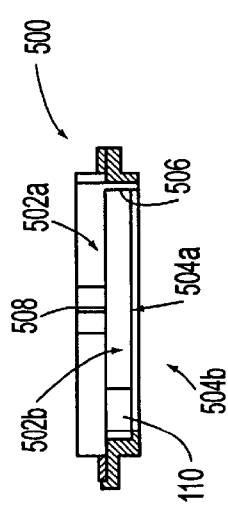

OPTICAL DEVICE, AND PROJECTION DISPLAY DEVICE INCLUDING THE SAME

BACKGROUND OF THE INVENTION

1. Field of Invention

This invention relates to an optical device incorporating a plurality of optical parts (elements), and to a projection display device including this optical device.

2. Description of Related Art

In a projection display device, in order to increase the usage efficiency of light and obtain a bright projected image, a polarized light illumination optical system and an integrator optical system are utilized. The polarized light illumination optical system is an optical system which utilizes only polarized light having one polarization direction as illuminating light. In this polarized light illumination optical system, a polarizing conversion element for converting non-polarized light (light having random polarization directions) into light having one polarization direction is employed. In addition, the integrator optical system is an optical system which divides light source light into a plurality of fine partial luminous fluxes, and which utilizes the respective partial luminous fluxes as illuminating light. In this integrator optical system, a lens array that includes a plurality of small lenses and that divides light source light into a plurality of partial luminous fluxes is employed. An illumination optical system is normally constructed by a combination of the polarized light illumination optical system and the integrator optical system.

SUMMARY OF THE INVENTION

Hitherto, respective optical parts used in the projection display device have been mounted in guides provided at respective predetermined positions on a chassis for mounting respective components of a projection display device thereon. Therefore, the relative positional accuracy of the respective optical components greatly depends on the relative positional accuracy of the respective guides provided on the chassis. Since the chassis is intended for mounting the respective components employed in the projection display device thereon, a certain large size is required, and the positional accuracy of the respective guides provided on the chassis is not very good. However, in order to increase the usage efficiency of the light by bringing out the functions of the polarized light illumination optical system and the integrator optical system, it is preferable to improve the relative positional accuracy when the optical parts used in these systems, especially, the polarizing conversion element and the lens array mounted on the chassis.

This invention is made to solve the above problem in the conventional art, and an object is to provide a technique for increasing the usage efficiency of the light of optical elements used in a projection display device.

In order to solve at least a part of the above problem, an optical device of the present invention includes:

a lens array having a plurality of small lenses;

a polarizing conversion element array having a plurality of polarization separating films that separate light emitted from the small lenses into two kinds of polarized light and a plurality of reflecting films that reflect one of the two kinds of polarized light separated by the polarization separating films, the polarizing conversion element array converting non-polarized light into one kind of linearly polarized light; and a jig that detachably incorporates the lens array and the polarizing conversion element array.

This optical device can detachably combine the lens array and the polarizing conversion element array in one. This can improve the relative positional accuracy of the optical parts (elements) included in this optical device. This can increase the usage efficiency of the light of the optical elements included in this optical device. In addition, since the optical device of the present invention is detachable, the optical elements incorporated into this optical device can easily be exchanged.

Here, in the above optical device, it is preferable that the lens array and the polarizing conversion element array have substantially rectangular outer shapes, that the jig includes:

a frame having substantially a rectangular first open surface and a rectangular second open surface on two sides of the frame, and having a hollow section inside the frame;

a partitioning projection provided on an inner peripheral surface of the frame that partitions the hollow section into a first storage section and a second storage section communicating with the first open surface and the second open surface;

fixing members that detachably fix the lens array, the polarizing conversion element array, and the frame in a state where the lens array and the polarizing conversion element array are stored in the frame; and that the lens array and the polarizing conversion element array are stored in the first storage section and the second storage section, respectively, from the first open surface and the second open surface.

According to the above jig, since the lens array can be stored in the first storage section from the first open surface, and the polarizing conversion element array can be stored in the second storage section from the second open surface, even if one of the optical element is required to be exchanged, it can be exchanged without removing the other optical element. Therefore, there is the advantage of easy exchange of the parts.

In addition, in the above optical device, it is also preferable that the lens array and the polarizing conversion element array have substantially rectangular outer shapes, that the jig includes:

a frame having substantially a rectangular first open surface and a rectangular second open surface on two sides of the frame, and having a hollow section inside the frame;

a projection provided close to the first open surface;

a step portion provided on an inner peripheral surface of the frame that divides the hollow section into a relatively small first storage section close to the first open surface and a relatively large second storage section close to the second open surface;

fixing members that detachably fix the lens array, the polarizing conversion element array, and the frame in a state where the lens array and the polarizing conversion element array are stored in said frame; and that the lens array and the polarizing conversion element array are stored in the first storage section and the second storage section in a predetermined order from the second open surface.

According to the above jig, the lens array and the polarizing conversion element array can be stored in the first storage section and the second storage section in a predetermined order from the second open surface. Therefore, there is the advantage of easy assembly.

Incidentally, the above respective optical devices may consist of a light-shielding plate stored in the frame inserted between the lens array and the polarizing conversion element array that shields at least a part of a light incident surface of the polarizing conversion element array.

By shielding at least a part of a light incident surface of the polarizing conversion element array, the purity (degree of polarization) of one kind of linearly polarized light emitted from the polarizing conversion element can be increased.

In addition, in the above respective optical devices, it is preferable that the polarizing conversion element array is divided into a first array unit and a second array unit, each having substantially a rectangular outer shape, and that one of the first storage section and the second storage section in which the first array unit and the second array unit are stored includes: positioning projections provided between the first array unit and the second array unit that define positions of the first array unit and the second array unit; and elastic members provided on opposing inner surfaces of the frame to press the first array unit and the second array unit onto the positioning projections, respectively.

In addition, in the above optical device, when the lens array and the polarizing conversion element array are stored in the first storage section and the second storage section in a predetermined order from the second open surface, the polarizing conversion element array may be divided into first array unit and second array unit, each having substantially a rectangular outer shape, one of the first storage section and the second storage section in which the first array unit and the second array unit are stored may include positioning projections provided between the first array unit and the second array unit that define positions of the first array unit and the second array unit, and the first array unit and the second array unit may be pressed onto the positioning projections by the fixing members.

According to the above arrangements, when the polarizing conversion element array is divided into the first array unit and the second array unit, the first array unit and the second array unit can be accurately stored with reference to the positioning projections.

Furthermore, in the above respective optical devices, one of the first storage section and the second storage section in which the lens array is stored may preferably include an elastic member used for the lens array provided on one inner surface of the frame to press the lens array onto an opposite inner surface of the frame.

According to the above arrangement, since the lens array is pressed onto the inner surface of the frame opposite to the inner surface onto which the elastic member used for the lens array is bonded, the lens array can be accurately stored with reference to this opposite inner surface.

A first projection display device of the present invention includes:

a light source;

a first lens array having a plurality of small lenses;

an optical device including a second lens array corresponding to the first lens array; a polarizing conversion element array having a plurality of polarization separating films that separate light emitted from the small lenses into two kinds of polarized light and a plurality of reflecting films that reflect one of the two kinds of polarized light separated by the polarization separating films, the polarizing conversion element array converting non-polarized light into one kind of linearly polarized light; and a jig that detachably unites the second lens array and the polarizing conversion element array;

a color light separation optical system that separates light emitted from the optical device into a plurality of color light;

a plurality of optical modulation devices that respectively modulate the plurality of color light based on an image signal;

a color light synthesizing section that synthesizes modulated light emitted from the plurality of optical modulation devices; and a projection optical system that projects synthesized light emitted from the color light synthesizing section.

By employing the optical device of the present invention for the above first and second projection display devices, the usage efficiency of the light of the projection display devices can be increased. In addition, since the optical elements included in this optical device are easily detachable, the parts included in this optical device can easily be exchanged.

BRIEF DESCRIPTION OF THE DRAWINGS

FIGS. 8(A)–(G) are illustrations showing the external appearance of a unit frame 100 for assembling a polarizing conversion unit 30.

FIGS. 10(A)–(F) are illustrations showing the external appearance of an optical device as a second embodiment of the present invention.

FIGS. 12(A)–(G) are illustrations showing the external appearance of a unit frame 500 for assembling a polarizing conversion unit 30A.

DETAILED DESCRIPTION OF PREFERRED EMBODIMENTS

Next, the mode for carrying out the present invention will be described on the basis of embodiments. Incidentally, in the following explanation, unless otherwise specified, the direction in which light travels is referred to as the z direction, the direction of 12 o'clock as viewed from the z direction is referred to as the y direction, and the direction of 3 o'clock is referred to as the x direction. In addition, a surface of an optical part as viewed from the z direction is referred to as a front surface, and a surface as viewed from the y direction is referred to as a top surface, and a description will be given by referring to the front view, in general.

Figure 1:
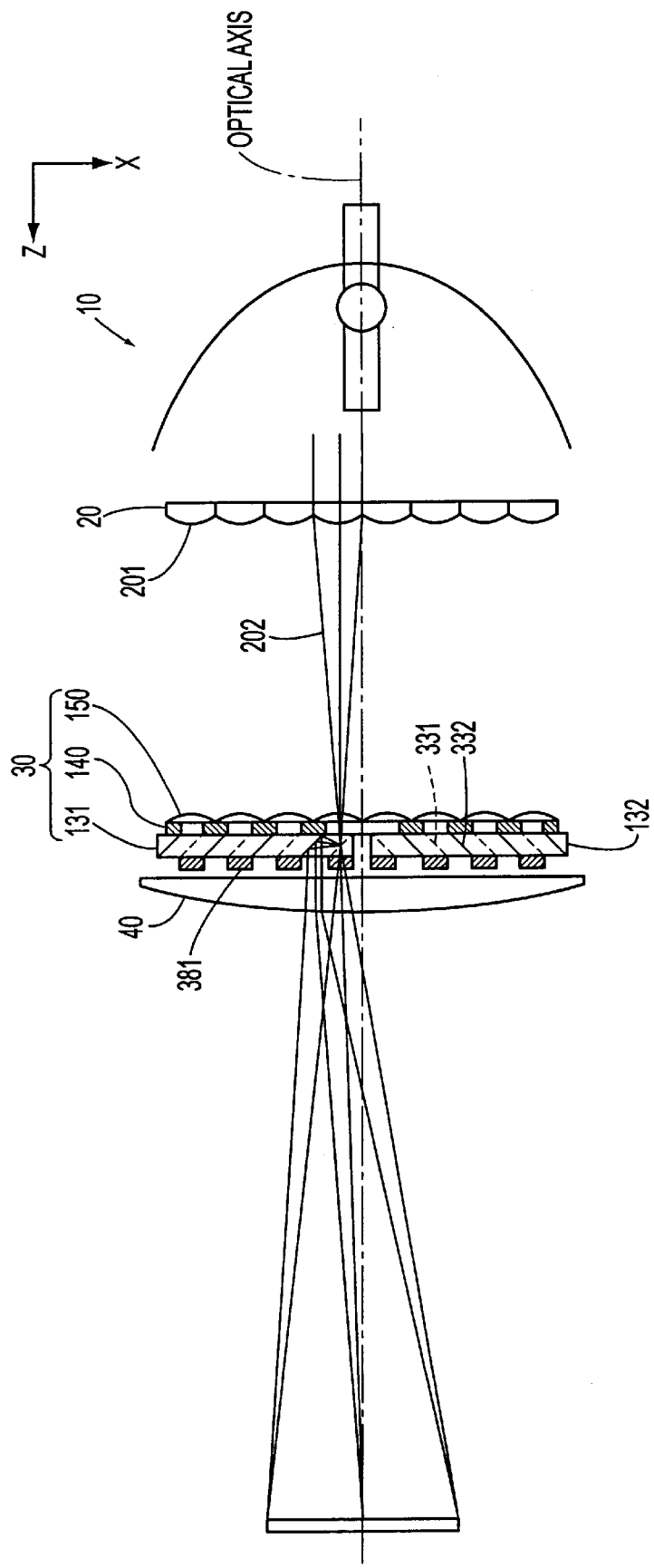
FIG. 1 is an illustration which schematically shows a construction of a polarized light illumination optical system that is applied to a projection display device.

A. First Embodiment:

FIG. 1 is an illustration which schematically shows a construction of a polarized light illumination optical system that is applied to a projection display device. This illumination optical system is an integrator illumination optical system consisting of a light source 10, a first lens array 20, a second lens array 150, a light-shielding plate 140, two polarizing conversion element arrays 131 and 132, and a superimposing lens 40. As described later, the second lens array 150, the light-shielding plate 140, and the two polarizing conversion element arrays 131 and 132 are combined as one polarizing conversion unit (optical device) 30.

Figure 2A:
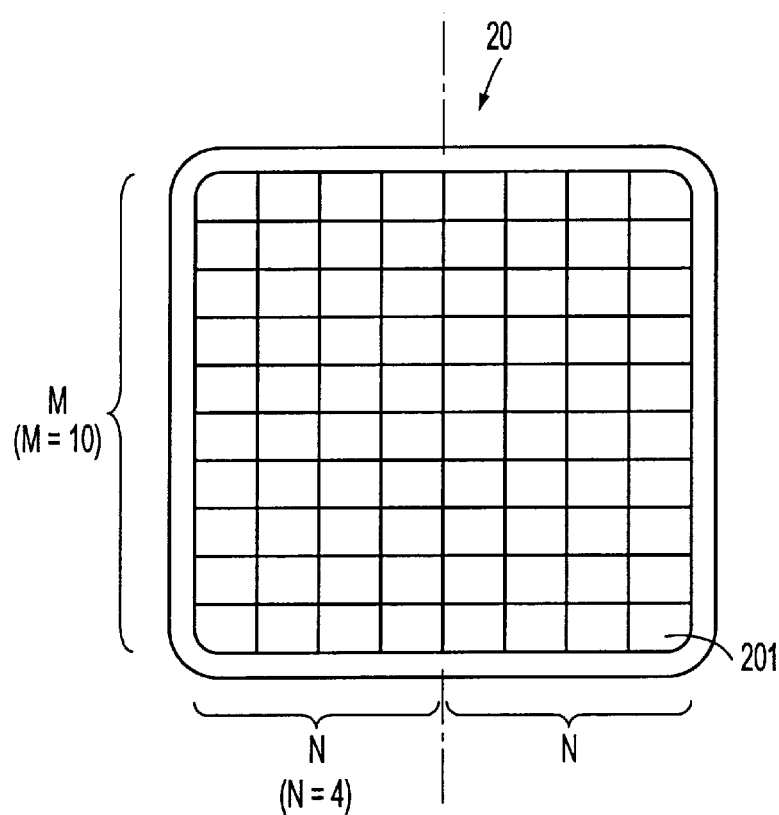
FIGS. 2(A)–(B) include a front view and a side view each showing the external appearance of a first lens array 20.
Figure 2B:
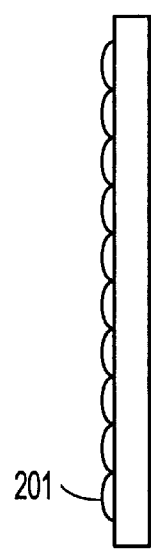

FIGS. 2(A)–(B) include a front view and a side view, each showing the external appearance of the first lens array 20. The first lens array 20 has a construction such that minute and small lenses 201 each having a rectangular outline are arranged in the form of a matrix with M rows in the vertical direction and 2N columns in the lateral direction. Therefore, from the center of the lens in the lateral direction, the lenses are present in N columns leftward and in N columns rightward. In this example, M=10, and N=4. The second lens array 150 is a lens array having a configuration similar to that of the first lens array 20. Incidentally, the first lens array 20 and the second lens array 150 may face in either the +z direction or −z direction. In addition, as shown in FIG. 1, they may face different directions from each other.

Figure 3:
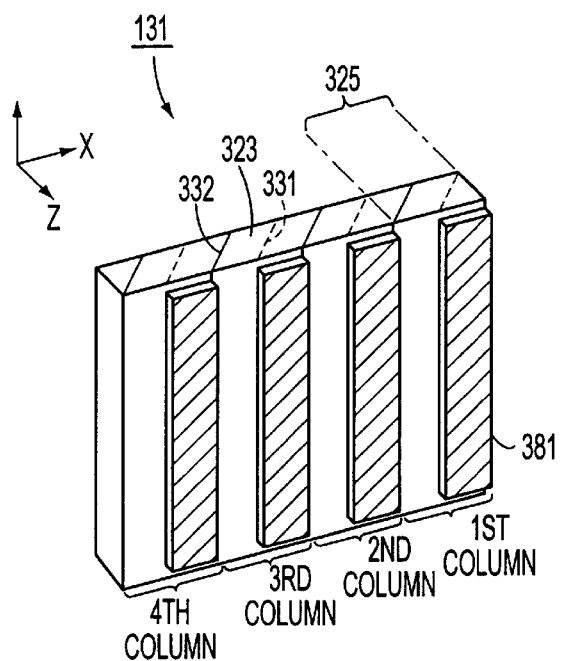
FIG. 3 is a perspective view showing the external appearance of a polarizing conversion element array 131.

FIG. 3 is a perspective view showing the external appearance of a polarizing conversion element array 131. This polarizing conversion element array 131 consists of a polarizing beam splitter array 320 and λ/2 phase layers 381 arranged selectively at a part of the light emitting surface of the polarizing beam splitter array 320 (shown by oblique lines). The polarizing beam splitter array 320 has a shape such that a plurality of columnar transmissive plates 323, each having the shape of parallelogram in cross section, are bonded sequentially. On the interfaces of the transmissive plates 323, polarization separating films 331 and reflecting films 332 are alternately formed. The λ/2 phase layers 381 are selectively bonded onto image portions in the x direction of light emitting surfaces of the polarization separating films 331 or the reflecting films 332. In this example, the λ/2 phase layers 381 are bonded onto the image portions in the x direction of the light emitting surfaces of the polarization separating films 331.

Figure 4:
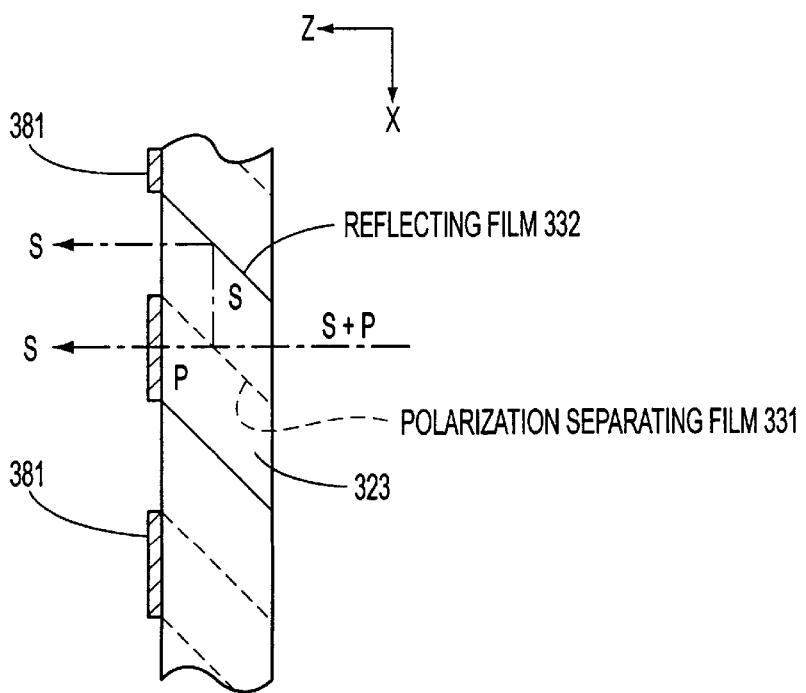
FIG. 4 is an illustration showing the function of the polarizing conversion element array 131.

The polarizing conversion element array 131 has the function of converting and emitting incident luminous fluxes into one kind of linearly polarized light (for example, s-polarized light or p-polarized light). FIG. 4 is an illustration showing the function of the polarizing conversion element array 131. Non-polarized light (incident light having random polarization directions) including an s-polarized light component and a p-polarized light component is incident on an incident surface of a polarizing conversion element. This incident light is first separated into s-polarization light and p-polarization light by the polarization separating film 331. The s-polarized light is reflected almost perpendicularly by the polarization separating film 331, and emitted after being further reflected perpendicularly by the reflecting film 332. On the other hand, the p-polarized light is transmitted through the polarization separating film 331 as is. The λ/2 phase layer 381 is arranged on the emitting surface of the p-polarized light transmitted through the polarization separating film, and this p-polarized light is converted into s-polarized light and then is emitted. Therefore, almost all of the light passing through the polarizing conversion element is emitted as s-polarized light. In addition, when the light emitted from the polarizing conversion element is to be converted into p-polarized light, the λ/2 phase layer 381 may be arranged on an emitting surface from which the s-polarized light reflected by the reflecting film 332 is emitted.

Incidentally, one polarization separating film 331 and one reflecting film 332 that are adjacent to each other and one λ/2 phase layer 381 may together form a block which may be regarded as one polarizing conversion element 325. The polarizing conversion element array 131 has such polarizing conversion elements 325 arranged in a plurality of columns in the x direction. In this embodiment, the polarizing conversion element array 131 is formed by 4 columns of polarizing conversion elements 325.

Since the polarizing conversion element array 132 is exactly the same as the polarizing conversion element array 131, an explanation thereof is omitted.

The two polarizing conversion element arrays 131 and 132 are, as shown in FIG. 1, arranged symmetrically with respect to an optical axis of the illumination optical system.

Figure 5:
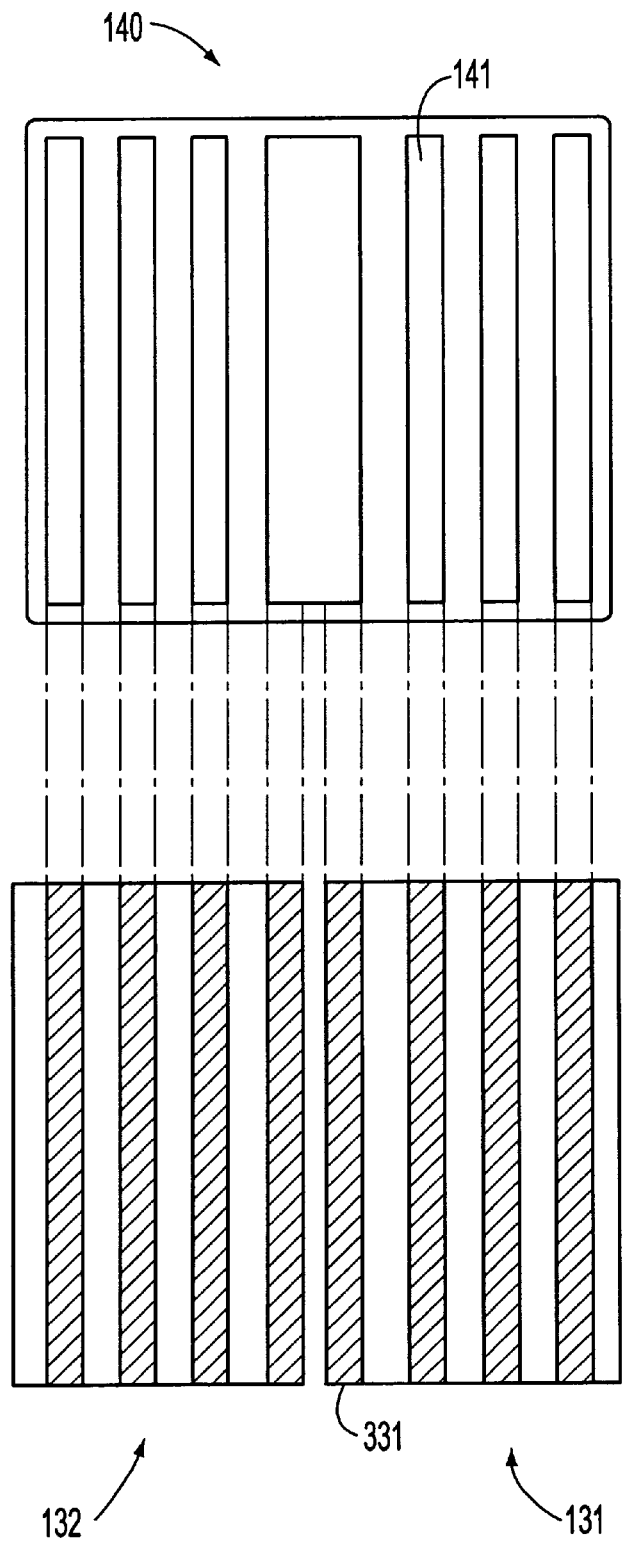
FIG. 5 is a plan view of a light-shielding plate 140.

FIG. 5 is a plan view of the light-shielding plate 140. The light-shielding plate 140 has a construction such that openings 141 are formed in a substantially rectangular plate member so that of the light incident surfaces of the two polarizing conversion element arrays 131 and 132, light is incident only on the light incident surface corresponding to the polarization separating film 331.

The non-polarized light emitted from the light source 10 shown in FIG. 1 is divided into a plurality of partial luminous fluxes 202 by a plurality of small lenses of the first lens array 20 and the second lens array 150, and is collected in the vicinity of the polarization separating films 331 of the two polarizing conversion element arrays 131 and 132. In particular, the second lens array 150 has the function of guiding a plurality of partial luminous fluxes emitted from the first lens array 20 so as to be collected on the polarization separating films 331 of the two polarizing conversion element arrays 131 and 132. The plurality of partial luminous fluxes incident on the two polarizing conversion element arrays 131 and 132 are converted into one kind of linearly polarized light and then are emitted, as described above. The plurality of partial luminous fluxes emitted from the two polarizing conversion element arrays 131 and 132 are superimposed on a predetermined illumination area 80 by the superimposing lens 40. This allows the illumination optical system to uniformly illuminate a predetermined illumination area.

As is understood from the foregoing explanation, in this illumination optical system, the second lens array 150, the light-shielding plate 140, and the two polarizing conversion element arrays 131 and 132 are important optical elements for efficiently converting the light emitted from a light source into one kind of linearly polarized light. Therefore, it is preferable to precisely arrange these optical elements. Thus, the polarizing conversion unit 30 of the present invention assembles these second lens array 150, light-shielding plate 140, and two polarizing conversion element arrays 131 and 132 together for the precise arrangement.

Figure 6C:
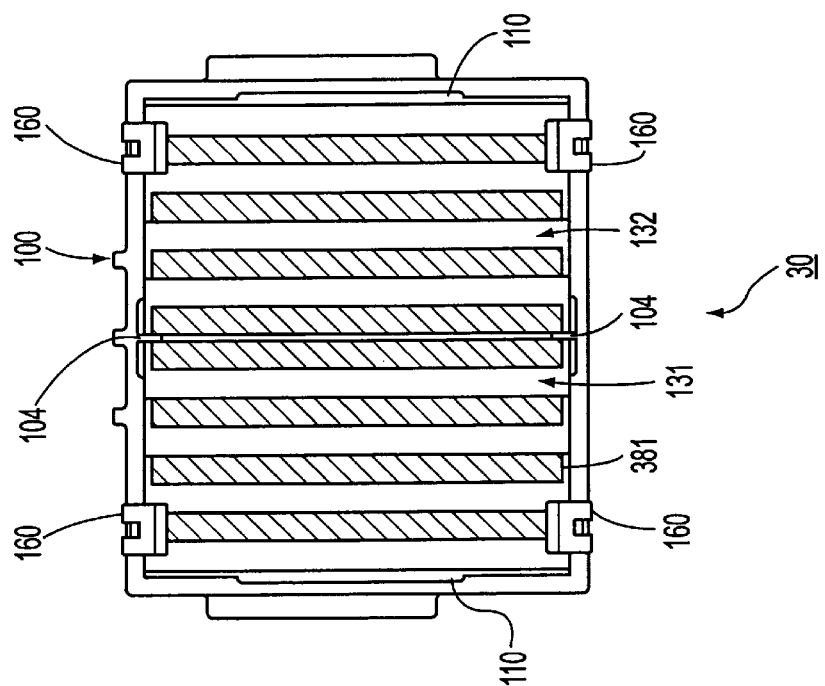
FIGS. 6(A)–(C) are illustrations showing the external appearance of an optical device as a first embodiment of the present invention.
Figure 6B:
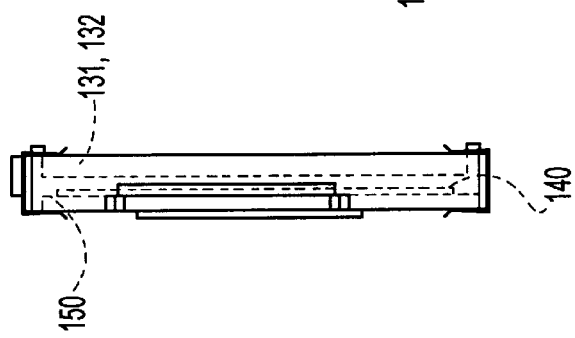
Figure 6A:
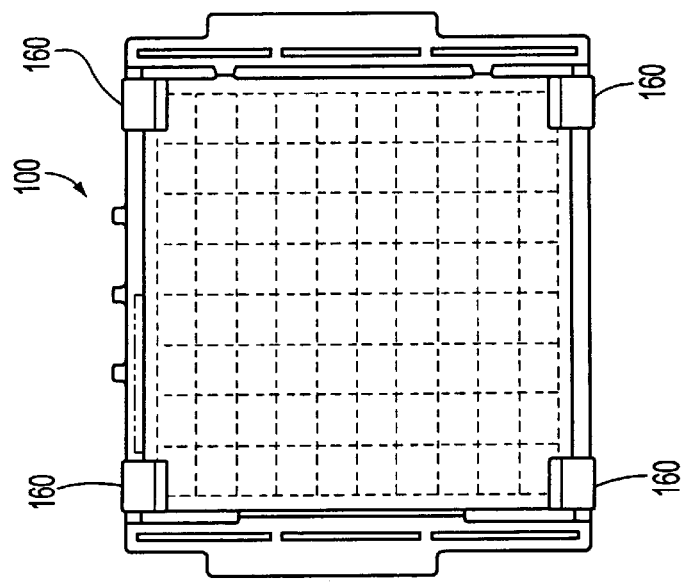
Figure 7:
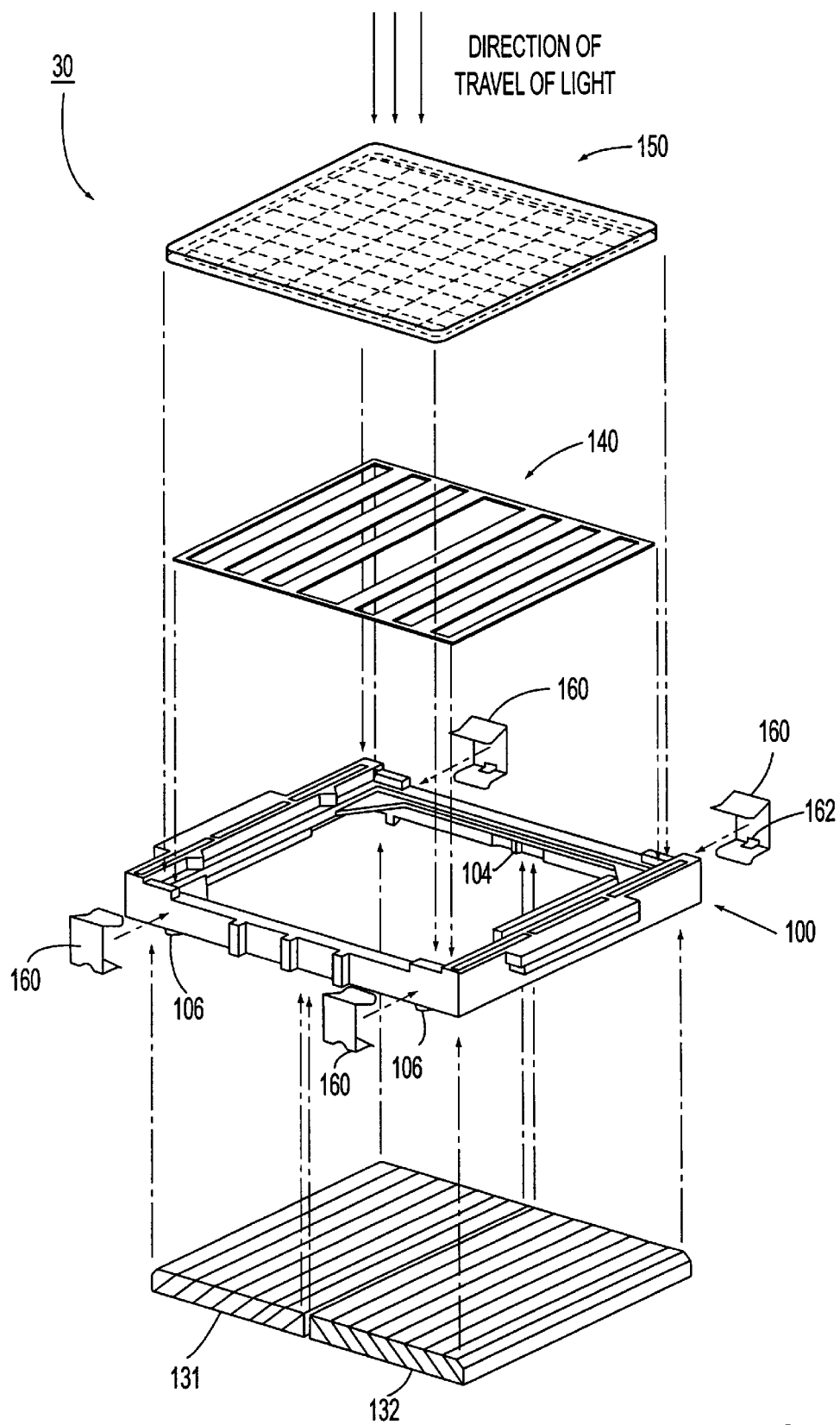
FIG. 7 is an exploded perspective view of the optical device as the first embodiment of the present invention.

FIGS. 6(A)–(C) are illustrations showing the external appearance of a polarizing conversion unit (optical device) as the first embodiment of the present invention. FIG. 7 is an exploded perspective view of this polarizing conversion unit. This polarizing conversion unit 30 consists of a unit frame 100, two polarizing conversion element arrays 131 and 132, a light-shielding plate 140, a lens array 150, and clips 160. From the side of one open surface (lower surface in FIG. 7) of the unit frame 100, the two polarizing conversion element arrays 131 and 132 are inserted, and the light-shielding plate 140 and the lens array 150 are inserted from the side of the other open surface (top surface in FIG. 7) in this order. These optical elements 131, 132, 140, and 150 are clamped by four clips 160 from the two directions of up and down in a state of being stored in the unit frame 100. Since the clips 160 are formed of an elastic body, the clips 160 can be easily attached and detached, and the respective parts of the optical device 30 can also be easily attached and detached to and from the unit frame.

FIGS. 8(A)–(G) are illustrations showing the external appearance of the unit frame 100 for assembling the polarizing conversion unit 30. FIG. 8(A) shows a front view, FIG. 8(B) shows a top view, FIG. 8(C) shows a bottom view, FIG. 8(D) shows a left side view, FIG. 8(E) shows a right side view, FIG. 8(F) shows a rear view, and FIG. 8(G) shows a cross-sectional view taken along AA' of FIG. 8(F). Incidentally, the front surface shows a light emitting surface, and the rear surface shows a light incident surface. As shown in FIG. 8(G), the unit frame 100 has substantially an H shape in cross section, and has a recess 102 on the side of the light emitting surface (front surface) and a recess 112 on the side of the light incident surface (rear surface). The unit frame 100 is made by, for example, a resin molding.

The unit frame 100 has the substantially rectangular recess 102 on the side of the light emitting surface, as shown in FIGS. 8(A) and 8(G). This recess 102 functions as a storage section for storing the two polarizing conversion element arrays 131 and 132. A partition 102b for partitioning a hollow section of the unit frame 100 into the recess 102 on the side of the light emitting surface and the recess 112 on the side of the light incident surface is provided on the inner surface of the recess 102, and the partition 102b has an opening 102a in the center thereof.

As shown in FIG. 8(A), projections 104 each having substantially the shape of a rectangular parallelepiped are provided on the center positions of the upper and lower inner surfaces of the recess 102 on the side of the light emitting surface, and small grooves 106 are provided on the two sides of each of the projections 104. In addition, grooves 108 are also provided on the left and right inner surfaces of the recess 102, and cushion materials 110 thicker than the grooves 108 are bonded to the grooves 108. The cushion materials 110 slightly project inward from the left and right inner surfaces of the recess 102. As shown in FIG. 6(C), the two polarizing conversion element arrays 131 and 132 are inserted into the recess 102 in such a manner that they sandwich the projections 104. At this time, the two polarizing conversion element arrays 131 and 132 are pressed toward the inside by the cushion materials 110, and are arranged on both left and right sides with reference to the projections 104. Therefore, a gap between the two polarizing conversion element arrays 131 and 132 is defined by the thickness of the projections 104. As the cushion materials, an elastic material such as porous rubber may be employed. Incidentally, the grooves 106 (FIG. 8(A)) provided on both sides of each of the projections 104 are provided so that, even if roots of the projections 104 protrude, the two polarizing conversion element arrays 131 and 132 do not contact the protruded portions.

As will be understood from FIG. 7, the two polarizing conversion element arrays 131 and 132 are stored in the recess 102 so that they face in opposite direction from each other across the projections 104, and the sides of the emitting surfaces of the polarizing conversion element arrays 131 and 132 (the side of the surface shown in FIG. 3 onto which the λ/2 phase layers 381 are bonded) face outward. Incidentally, in order not to mistake the direction of insertion of the polarizing conversion element arrays 131 and 132, the outermost transmissive member constituting the polarizing conversion element arrays 131 and 132 may be preferably colored in a color different from that of the other transmissive members. For example, the outermost transmissive member may be a blue plate glass, and the other transmissive members may be white plate glasses. In addition, it is effective to provide a notch as a mark on the outermost transmissive member.

On the side of the light incident surface of the unit frame 100, a substantially rectangular recess 112a slightly smaller than the outer shape of the substantially rectangular unit frame 100 is formed, as shown in FIGS. 8(F) and 8(G). Furthermore, a step portion is provided on the bottom of the recess 112a, whereby a recess 112b even more slightly smaller than the recess 112a is formed. This recess 112b is partitioned from the recess 102 by the partition 102b.

This recess 112b is a storage section for storing the above-described light-shielding plate 140. Since the recess 112b has a size substantially the same as that of the light-shielding plate 140, by inserting the light-shielding plate 140 into this recess 112b, the light-shielding plate 140 can be accurately arranged with respect to the two polarizing conversion element arrays 131 and 132.

The recess 112a is a storage section for storing the lens array 150. As shown in FIG. 8(F), two projections 116 are provided on the right inner surface of the recess 112a for the positioning of the lens array 150. In addition, the cushion material 110 is bonded onto the left inner surface. When inserting the lens array 150, the lens array 150 is inserted into the recess 112a in such a manner as to press the cushion material 110 leftward. The lens array 150 is pressed by the cushion material 110 in the direction of the projections 116, and is accurately arranged in a lateral direction with reference to the projections 116.

At both left-hand upper and lower ends and right-hand upper and lower ends on the side of the front surface of the unit frame 100, projection-like clipping portions 118 are provided, as shown in FIGS. 8(A) to 8(E). Each of the clips 160 having substantially a U shape (FIG. 7) and a hole 162 corresponding to the clipping portion 118 is provided therein. By these clips 160, the two polarizing conversion element arrays 131 and 132 inserted into the unit frame 100 and the lens array 150 can be sandwiched from both sides and fixed to the unit frame 100.

Figure 9A:
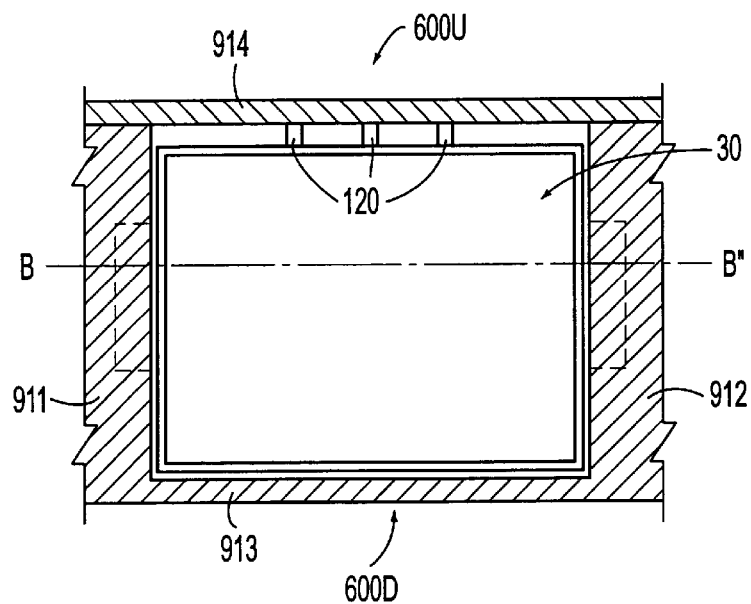
FIGS. 9(A)–(B) are schematic cross-sectional views showing a state in which the polarizing conversion unit 30 is incorporated into the projection display device.
Figure 9B:
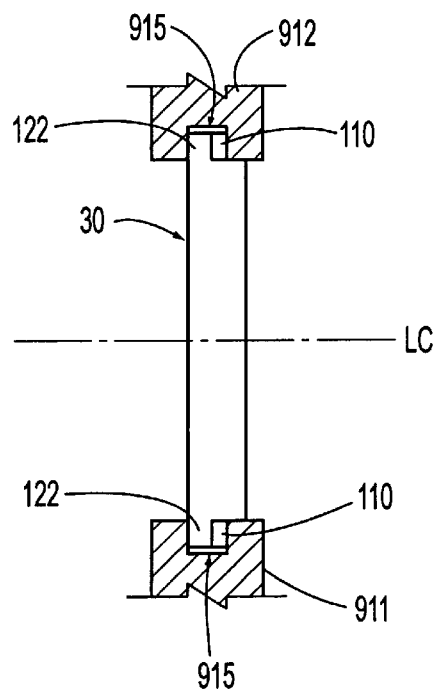

Three projections 120 are formed on the top surface of the unit frame 100, as will be understood from FIGS. 8(A) and 8(B). In addition, on the left and right outer frames of the unit frame 100, guide insertion portions 122 that are inserted into holding grooves (to be described later) in the projection display device are provided. On the side of the light emitting surface (front) of these guide insertion portions 122, the cushion materials 110 are bonded. FIGS. 9(A)–(B) are schematic sectional views showing a state in which the polarizing conversion unit 30 is incorporated in the projection display device. FIG. 9(B) shows a schematic cross-sectional view taken along BB' of FIG. 9(A). The optical parts (elements) to be incorporated into the projection display device are normally sandwiched and incorporated by a chassis 600D called a lower light guide, and a cover 600U called an upper light guide. The upper and lower light guides 600U and 600D form a pair of left and right vertical walls 911 and 912 vertically extending along the plane perpendicular to the optical axis LC, a bottom wall 913 connecting lower ends of these vertical walls 911 and 912, and an upper wall 914 connecting upper ends of these vertical walls 911 and 912. The polarizing conversion unit 30 is arranged in a portion surrounded by the respective walls 911 to 914. On both the left and right side walls 911 and 912, holding grooves 915 are provided. The polarizing conversion unit 30 is incorporated by inserting left and right guide insertion portions 122 into these holding grooves 915. Since the cushion materials 110 are bonded on the front surface side of the guide insertion portions 122, as described above, the guide insertion portions 122 are pressed to the side of the rear surface by the cushion materials 110, whereby the polarizing conversion unit 30 can be fixed with reference to surfaces of the holding grooves 915 contacting the rear surfaces of the guide insertion portions 122.

The projections 120 provided on the top surface of the unit frame 100 are intended for pressing the upper wall 914, as shown in FIG. 9(A). This can prevent the polarizing conversion unit 30 from rattling up and down. In addition, the lower light guide 600D is provided with a ventilation opening (not shown). Cooling air fed through the ventilation opening flows along the plane of the polarizing conversion unit 30, and is exhausted after flowing between the projections 120 and the upper light guide 600U. This can cool the polarizing conversion unit 30 with efficiency.

As described above, the two polarizing conversion element arrays 131 and 132 are inserted from the side of one open surface of the unit frame 100, the light-shielding plate 140 and the lens array 150 are sequentially inserted from the side of the other open surface, whereby the polarizing conversion unit 30 combined in one piece can be constructed (FIG. 7). This can accurately arrange the respective components in relation to each other, and increase the usage efficiency of the light. In addition, this polarizing conversion unit 30 has a simple structure such that the respective components 131, 132, 140, and 150 are inserted into the unit frame 100 and are merely fixed by the clips 160, so that the polarizing conversion unit 30 can be easily attached and detached. This allows the respective components to be easily exchanged.

Incidentally, projections similar to the projections 104 shown in FIG. 8(A) may be formed in the centers of upper and lower inner surfaces of the recess 112b. At this time, grooves corresponding to these projections may be provided in the centers of upper and lower ends of the light-shielding plate 140. Conversely, grooves may be provided in the centers of upper and lower inner surfaces of the recess 112b, and projections corresponding to the light-shielding plate 140 may be provided. This allows the light-shielding plate 140 to be arranged with reference to the center projections, similarly to the two polarizing conversion element arrays 131 and 132.

In addition, projections similar to the projections 104 may also be provided in the centers of the upper and lower inner surfaces of the recess 112a. At this time, grooves corresponding to these projections may be provided in the centers of upper and lower ends of the lens array 150. Conversely, grooves may be provided in the centers of upper and lower side surface of the recess 112a, and projections corresponding to these grooves may be provided on the lens array 150. This allows the lens array 150 to be arranged with reference to the center projections, similarly to the two polarizing conversion element arrays 131 and 132.

Furthermore, the two polarizing conversion element arrays 131 and 132 may be united in one polarizing conversion element array. At this time, the direction of the polarization separating film 331 and the reflecting film 332 may not be symmetrical with respect to the center, but be parallel to each other. When one polarizing conversion element array is employed, a projection is provided on the right or left inner surface of the recess 102, and the cushion material may be bonded onto the inner surface of the side opposite thereto, similarly to the recess 112a. This allows the polarizing conversion element array to be arranged with reference to the projection provided on the right or left inner surface.

Figure 11:
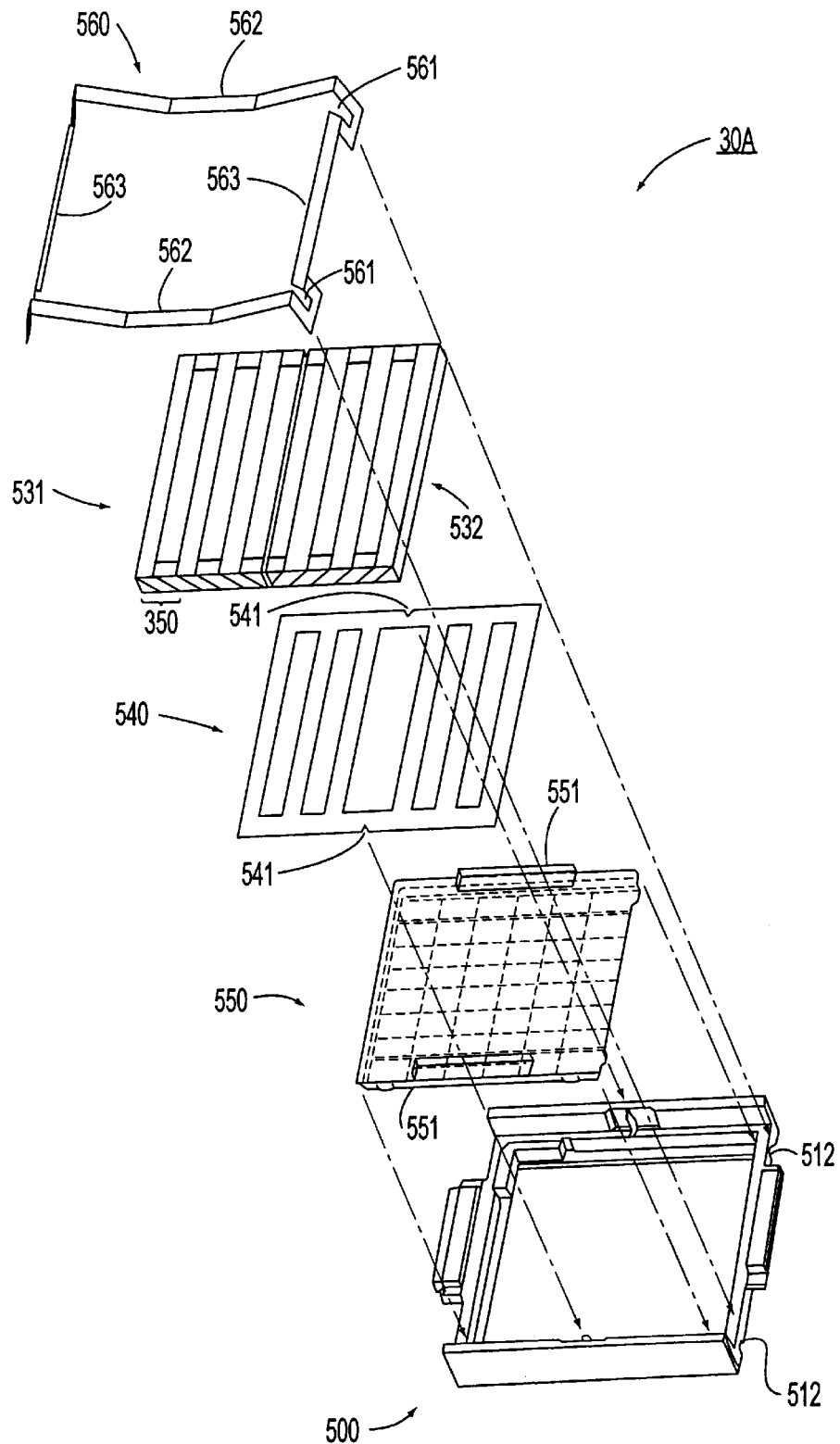
FIG. 11 is an exploded perspective view of the optical device as the second embodiment of the present invention.

B. Second Embodiment:

FIGS. 10(A)–(F) are illustrations showing the external appearance of a polarizing conversion unit (optical device) as a second embodiment of the present invention. FIG. 11 is an exploded perspective view of this polarizing conversion unit. As shown in FIG. 11, this polarizing conversion unit 30A consists of a unit frame 500, a lens array 550, a light-shielding plate 540, and two polarizing conversion element arrays 531 and 532. From the side of one open surface (top surface in FIG. 11) of the unit frame 500, the lens array 550, the light-shielding plate 540, and the two polarizing conversion element arrays 531 and 532 are sequentially inserted. These optical elements 531, 532, 540, and 550 are clamped by a clip 560 from the three directions of above, left and right in a state of being stored in the unit frame 500. The clip 560 has first connecting portions 562 for laterally connecting engagement portions 561, each engagement portion 561 having substantially a U shape that is caught by projections 512 provided at four corners of the unit frame 500, and second connecting portions 563 for vertically connecting the engagement portions 561. Since the clip 560 is formed of an elastic body, the clip 560 can be easily attached and detached, and the respective components of the optical device 30A can also be easily attached and detached to and from the unit frame.

The lens array 550, light-shielding plate 540 and the polarizing conversion element arrays 531 and 532 have the same functions as those of the lens array 150, light-shielding plate 140 and polarizing conversion element arrays 131 and 132 in the first example, respectively. The polarizing conversion element arrays 531 and 532, shown in FIG. 11, are constructed by three columns of polarizing conversion elements 350, the lens array 550 is constructed by 8 rows and 6 columns corresponding thereto, and an opening of the light-shielding plate 540 is also formed corresponding thereto. The constructions of the respective optical elements merely show an example, and they may be similar to those of the first embodiment. Incidentally, an explanation of the functions of the respective optical elements is omitted.

FIGS. 12(A)–(G) are illustrations showing the external appearance of the unit frame 500 for assembling the polarizing conversion unit 30A. FIG. 12(A) shows a front view, FIG. 12(B) shows a top view, FIG. 12(C) shows a bottom view, FIG. 12(D) shows a left side view, FIG. 12(E) shows a right side view, FIG. 12(F) shows a rear view, and FIG. 12(G) shows a cross-sectional view taken along CC' of FIG. 12(A). Incidentally, similarly to FIGS. 8(A)–(G), the front surface shows a light emitting surface, and the rear surface shows a light incident surface.

The unit frame 500 has a substantially rectangular recess 502a on the side of the light emitting surface, as shown in FIG. 12(G). Furthermore, a step portion is provided on the bottom of the recess 502a, whereby a recess 502b even more slightly smaller than the recess 502a is formed. The bottom of this recess 502b functions as a partition 504b for partitioning the recess 502b and the light incident surface side.

The partition 504b has an opening 504a formed in the center thereof. This opening 504a corresponds to the light incident surface of the polarizing conversion unit 30A.

The lower recess 502b of FIG. 12(G) is a storage section for storing the lens array 550. As shown in FIG. 12(A), two projections 506 are respectively provided on the right and lower inner surfaces of the recess 502b for the positioning of the lens array 550. In addition, a cushion material 110 is bent and bonded from the leftward upper end to the upward left end of the recess 502b. By inserting the lens array 550 into the recess 502b in such a manner as to press an upper left corner of the lens array 550 to the cushion material 110, the lens array 550 is pressed downward and rightward by the cushion material 110, and is accurately arranged in the lateral and vertical directions with reference to the right and lower projections 506. Incidentally, spacers 551 are bonded to the upper and lower ends of the lens array 550 on the side of the light-shielding plate for providing a space between the light-shielding plate 540 and the lens array 550, as shown in FIG. 11.

The recess 502a is a storage section for storing the light-shielding plate 540 and the two polarizing conversion element arrays 531 and 532. As shown in FIG. 12(A), projections 508, each having substantially the shape of a rectangular parallelepiped, are provided on the center positions of the upper and lower inner surfaces of the recess 502a. In addition, grooves 510 similar to the grooves 106 provided on both sides of each of the projections 104 in the first embodiment are provided on the two sides of each of the projections 508. Furthermore, clipping portions 512 are provided on both upper and lower portions of the left and right outer side surfaces of the unit frame 500.

The light-shielding plate 540 is provided with grooves 541, which correspond to the projections 508, on the upper and lower central ends, as shown in FIG. 11. The light-shielding plate 540 is inserted into the recess 502a in such a manner that the projections 508 fit into the grooves 541 of the light-shielding plate 540. This allows the light-shielding plate 540 to be accurately arranged in the recess 502a with reference to the projections 508.

To the upper (light emitting surface) side of the light-shielding plate 540 of the recess 502a, the two polarizing conversion element arrays 531 and 532 are further inserted in such a manner that they sandwich the projections 508, as shown in FIG. 11. Thereafter, holes of the engagement portions 561 of four corners of the clip 560 are fitted to the clipping projections 512 of the unit frame 500 while the polarizing conversion element arrays 531 and 532 are pressed downward by the upper and lower connecting portions 562 of the clip 560, whereby the respective components 550, 540, 531, and 532 are fixed to the unit frame 500. Since the clip 560 is formed of an elastic body (plate spring), the two polarizing conversion element arrays 531 and 532 are pressed from the light emitting surface to the direction of the light incident surface by the clip 560, and are fixed in a state of being pressed from the left side surface and right side surface to the direction of the projections 508. This allows the polarizing conversion element arrays 531 and 532 to be accurately arranged on both left and right sides with reference to the projections 508. In addition, the respective components (parts) of the polarizing conversion unit 30A can be fixed in the unit frame 500. A gap between the two polarizing conversion element arrays 531 and 532 is defined by the thickness of the projections 508, similarly to the first embodiment.

On the left and right side surfaces of the unit frame 500, guide insertion portions 522 to be inserted into holding grooves in the projection display device are provided. On the side of the front surfaces of these guide insertion portions 522, the cushion materials 110 are bonded. This allows the polarizing conversion unit 30A to be fixed with reference to surfaces of the holding grooves contacting the rear surfaces of the guide insertion portions 522, just as described in the first embodiment.

As described above, in the second embodiment, the lens array 550, the light-shielding plate 540 and two polarizing conversion element arrays 531 and 532 are sequentially inserted from the side of one open surface of the unit frame 500, whereby the polarizing conversion unit 30A combined in one piece can be constructed (FIG. 11). This can accurately arrange the respective components in relation to each other, and increase the usage efficiency of the light. In addition, since this polarizing conversion unit 30A has a simple structure such that the respective components 550, 540, 531, and 532 are inserted into the unit frame 500 and are fixed by the clip 560, the polarizing conversion unit 30A can be easily attached and detached. This allows the respective components to be easily exchanged.

Incidentally, just as described in the first embodiment, projections may be provided in the centers of the upper and lower inner surfaces of the recess 502b, and grooves corresponding to the projections may be provided in the centers of upper and lower ends of the lens array 550. Conversely, grooves may be provided in the centers of upper and lower side surfaces of the recess 502b, and projections corresponding to the grooves may be provided on the lens array 550. This allows the lens array 550 to be arranged with reference to the center projections.

In addition, while an example has been shown in this embodiment in which the lens array 550, the light-shielding plate 540, and the polarizing conversion element arrays 531 and 532 are inserted into the unit frame 500 in this order, they may be inserted in reverse order.

In addition, while a construction including the light-shielding plate has been described in the first and second embodiments, a construction that does not include the light-shielding plate may be employed.

Figure 13:
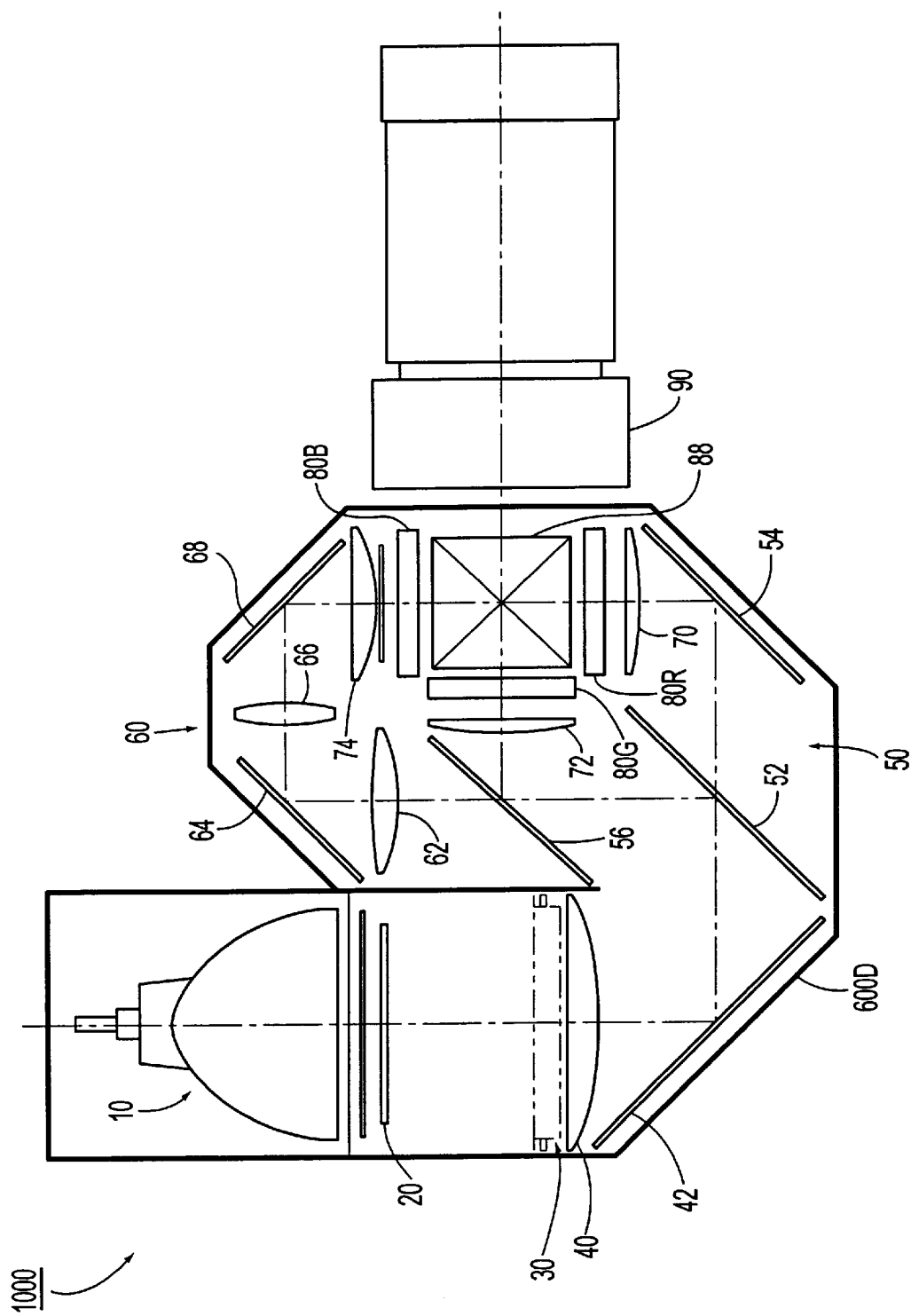
FIG. 13 is a schematic plan view showing the construction of a projection display device incorporating the optical device of the present invention.

C. Construction of Projection Display Device:

FIG. 13 is a schematic plan view showing a construction of a projection display device incorporating the optical device of the present invention, and shows a state where respective components are mounted on the lower light guide 600D. This projection display device 1000 consists of an illumination optical system composed of a light source 10, a first lens array 20, an optical device (polarizing conversion unit) 30 of the present invention, and a superimposing lens 40. In addition, the projection display device 1000 consists of a reflecting mirror 42, a color light separation optical system 50 including dichroic mirrors 52 and 56, and a reflecting mirror 54. Furthermore, the projection display device 1000 consists of a light guide optical system including an incident-side lens 62, a relay lens 66, and reflecting mirrors 64 and 68. In addition, the projection display device 1000 consists of three sheets of field lenses 70, 72, and 74, three sheets of liquid crystal light valves 80R, 80G, and 80B, a cross-dichroic prism 88, and a projection lens 90.

Since the light source 10, the first lens array 20, the optical device 30 and the superimposing lens 40 are the same as those of the illumination optical system shown in FIG. 3, an explanation thereof is omitted. The reflecting mirror 42 has the function of reflecting light emitted from the superimposing lens 40 in the direction of the color light separation optical system 50. The color light separation optical system 50 has the function of separating light emitted from the superimposing lens 40 into color light of three colors, i.e., red, green, and blue. The first dichroic mirror 52 transmits a red light component of the light emitted from the superimposing lens 40, and reflects a blue light component and a green light component. The red light transmitted by the first dichroic mirror 52 is reflected from the reflecting mirror 54, and passes through the field lens 70 to reach the red light liquid crystal light valve 80R. This field lens 70 converts respective partial luminous fluxes emitted from the superimposing lens 40 into luminous fluxes parallel to the center axes (main light beam) thereof. Similar descriptions apply to the field lenses 72 and 74 provided in front of other liquid crystal light valves.

Of the blue light and the green light reflected from the first dichroic mirror 52, the green light is reflected by the second dichroic mirror 56, and passes through the field lens 72 to reach the green light liquid crystal light valve 80G. On the other hand, the blue light is transmitted through the second dichroic mirror 56, and passes through the light guide optical system 60, i.e., the incident-side lens 62, the reflecting mirror 64, the relay lens 66, and the reflecting mirror 68 and further, passes through the field lens 74 to reach the blue light liquid crystal light valve 80B. Incidentally, since the length of the optical path of the blue light is longer than that of other color light, the light guide optical system 60 is employed for the blue light in order to prevent deterioration of the usage efficiency of the light due to diffusion of light or the like. That is, the luminous flux incident on the incident-side lens 62 is propagated to the field lens 74 without deterioration.

Three liquid crystal light valves 80R, 80G, and 80B function as an optical modulation device for modulating the incident light in accordance with given image information (image signal). This allows each of the color light incident on the three liquid crystal light valves 80R, 80G, and 80B to be modulated in accordance with given image information to form images of each of the color light. Incidentally, the illumination area 80 shown in FIG. 1 corresponds to the liquid crystal light valves 80R, 80G, and 80B.

The modulated light of the three colors emitted from the three liquid crystal light valves 80R, 80G, and 80B is incident on the cross-dichroic prism 88. The cross-dichroic prism 88 functions as a color light synthesizing section which forms a color image by synthesizing modulated light of three colors. In the cross-dichroic prism 88, a dielectric multilayer film for reflecting the red light and a dielectric multilayer film for reflecting the blue light are formed on the interfaces of four rectangular prisms in substantially an X shape. The modulated light of three colors is synthesized by these dielectric multilayer films, and synthesized light for projecting a color image is formed. The synthesized light formed in the cross-dichroic prism 88 is emitted to the direction of the projection lens 90. The projection lens 90 has the functions of projecting the synthesized light onto a projection screen, and displays the color image on the projection screen.

Since the optical device (polarizing conversion unit) 30 described in the first embodiment is employed in the projection display device of the present invention, the relative positional accuracy of the optical elements (parts) included in this optical device can be improved. This can increase the usage efficiency of the light in the projection display device. In addition, the components of this optical device are easily attachable and detachable, even if a fault occurs in the projection display device due to a fault of this optical device, faulty components included in this optical device can be easily exchanged, so that the fault of the projection display device can be easily solved. Even if the optical device described in the second embodiment is employed, similar effects can be obtained.

Incidentally, this invention is not limited to the above embodiments and modes for carrying out the invention, and can be carried out in various forms without departing from the spirit and scope thereof. For example, the following modifications may be made.

(1) The respective constrictions of the lens array, the light-shielding plate, and polarizing conversion element array included in the optical device explained in the above first and second embodiments show one example. That is, the respective constrictions of these lens array, light-shielding plate, and polarizing conversion element array, for example, the number of columns of the polarizing conversion element in the polarizing conversion element array, the number of rows and columns of the lens array, the presence of the light-shielding plate, and the shape of the small lens constituting the lens array, should be executed in various modes in response to the characteristics of the respective components such as the light source and the like, and the specifications of the projection display device.

(2) While the above projection display device employing the light valves that utilizes transmissive liquid crystal panels as the optical modulation device has been described, the light valves may utilize reflective liquid crystal panels. In addition, the projection display device may employ an optical modulation device utilizing mirror elements.

What is claimed is:

1. An optical device, comprising:
    a lens array having a plurality of small lenses;
    a polarizing conversion element array having a plurality of polarization separating films that separate light transmitted from said small lenses into two kinds of polarized light and a plurality of reflecting films that reflect one of said two kinds of separated by said polarization separating films, said polarizing conversion element array converting non-polarized light into one kind of linearly polarized light; and
    a jig that detachably incorporates said lens array and said polarizing conversion element array, said lens array and said polarizing conversion element array having substantially rectangular outer shapes, said jig including:
        a frame having a substantially rectangular first open surface on one side of said frame and a substantially rectangular second open surface on another side of said frame, and having a hollow section inside said frame;
        a partitioning projection provided on an inner peripheral surface of said frame that partitions said hollow section into a first storage section communicating with said first open surface and second storage section communicating with said second open surface;
        fixing members that detachably fix said lens array, said polarizing conversion element array, and said frame in a state where said lens array and said polarizing conversion element array are stored in said frame; and
        said lens array being stored in said first storage section from said first open surface and said polarizing conversion element array being stored in said second storage section from said second open surface.

2. The optical device as claimed in claim 1, further comprising a light-shielding plate stored in said frame inserted between said lens array and said polarizing conversion element array that shields at least a part of a light incident surface of said polarizing conversion element array.

3. The optical device as claimed in claim 1, said polarizing conversion element array being divided into a first array unit and a second array unit, each having substantially a rectangular outer shape, and one of said first storage section and said second storage section in which said first array unit and said second array unit are stored including: positioning projections provided between said first array unit and said second array unit that define positions of said first array unit and said second array unit; and elastic members provided on opposing inner surfaces of said frame that press said first array unit and said second array unit onto said positioning projections, respectively.

4. The optical device as claimed in claim 1, one of said first storage section and said second storage section in which said lens array is stored including an elastic member provided on one inner surface of said frame that presses said lens array onto an opposite inner surface of said frame.

5. An optical device, comprising:

a lens array having a plurality of small lenses;

a polarizing conversion element array having a plurality of polarization separating films that separate light transmitted from said small lenses into two kinds of polarized light and a plurality of reflecting films that reflect one of said two kinds of separated by said polarization separating films, said polarizing conversion element array converting non-polarized light into one kind of linearly polarized light; and a jig that detachably incorporates said lens array and said polarizing conversion element array, said lens array and said polarizing conversion element array having substantially rectangular outer shapes, said jig including:

a frame having a substantially rectangular first open surface on one side of said frame and a substantially rectangular second open surface on another side of said frame, and having a hollow section inside said frame;

a projection provided close to said first open surface;

a step portion provided on an inner peripheral surface of said frame that divides said hollow section into a first storage section close to said first open surface and a second storage section larger than said first storage section close to said second open surface;

fixing members that detachably fix said lens array, said polarizing conversion element array, and said frame in a state where said lens array and said polarizing conversion element array are stored in said frame; and said lens array and said polarizing conversion element array being stored in said first storage section and said second storage section in a predetermined order from said second open surface.

6. The optical device as claimed in claim 5, further comprising a light-shielding plate stored in said frame inserted between said lens array and said polarizing conversion element array that shields at least a part of a light incident surface of said polarizing conversion element array.

7. The optical device as claimed in claim 5, said polarizing conversion element array being divided into a first array unit and a second array unit, each having substantially a rectangular outer shape, and one of said first storage section and said second storage section in which said first array unit and said second array unit are stored including: positioning projections provided between said first array unit and said second array unit that define positions of said first array unit and said second array unit; and elastic members provided on opposing inner surfaces of said frame that press said first array unit and said second array unit onto said positioning projections, respectively.

8. The optical device as claimed in claim 5, said polarizing conversion element array being divided into first array unit and second array unit, each having substantially a rectangular outer shape, one of said first storage section and said second storage section in which said first array unit and said second array unit are stored including positioning projections provided between said first array unit and said second array unit that define positions of said first array unit and said second array unit, and said first array unit and said second array unit being pressed onto said positioning projections by said fixing members.

9. The optical device as claimed in claim 5, one of said first storage section and said second storage section in which said lens array is stored including an elastic member provided on one inner surface of said frame that presses said lens array onto an opposite inner surface of said frame.

10. A projector that projects an image, comprising:

a light source;

a first lens array having a plurality of small lenses;

an optical device including a second lens array having a plurality of small lenses; a polarizing conversion element array having a plurality of polarization separating films that separate light transmitted from said small lenses into two kinds of polarized light and a plurality of reflecting films that reflect one of said two kinds of polarized light separated by said polarization separating films, said polarizing conversion element array converting non-polarized light into one kind of linearly polarized light; and a jig, that detachably unites said second lens array and said polarizing conversion element array;

an optical modulation device that modulates light emitted from said optical device based on an image signal; and a projection optical system that projects modulated light emitted from said optical modulation device, said second lens array and said polarizing conversion element array having substantially rectangular outer shapes, said jig including:

a frame having a substantially rectangular first open surface on one side of said frame and a substantially rectangular second open surface on another side of said frame, and having a hollow section inside said frame;

a partitioning projection provided on an inner peripheral surface of said frame that partitions said hollow section into a first storage section connected to said first open surface and second storage section connected to said second open surface;

fixing members that detachably fix said second lens array, said polarizing conversion element array, and said frame in a state where said lens array and said polarizing conversion element array are stored in said frame; and said second lens array being stored in said first storage section from said first open surface and said polarizing conversion element array being stored in said second storage section from said second open surface.

11. The projector as claimed in claim 10, further comprising a light-shielding plate stored in said frame inserted between said second lens array and said polarizing conversion element array that shields at least a part of a light incident surface of said polarizing conversion element array.

12. The projector as claimed in claim 10, said polarizing conversion element array being divided into a first array unit and a second array unit, each having substantially a rectangular outer shape, and one of said first storage section and said second storage section in which said first array unit and said second array unit are stored including: positioning projections provided between said first array unit and said second array unit that define positions of said first array unit and said second array unit; and elastic members provided on opposing inner surfaces of said frame that press said first array unit and said second array unit onto said positioning projections, respectively.

13. The projector as claimed in claim 12, one of said first storage section and said second storage section in which said second lens array is stored including an elastic member provided on one inner surface of said frame that presses said second lens array onto an opposite inner surface of said frame.

14. A projector that projects an image, comprising:
a light source;
a first lens array having a plurality of small lenses;
an optical device including a second lens array having a plurality of small lenses; a polarizing conversion element array having a plurality of polarization separating films that separate light transmitted from said small lenses into two kinds of polarized light and a plurality of reflecting films that reflect one of said two kinds of polarized light separated by said polarization separating films, said polarizing conversion element array converting non-polarized light into one kind of linearly polarized light; and a jig that detachably unites said second lens array and said polarizing conversion element array;
an optical modulation device that modulates light emitted from said optical device based on an image signal; and
a projection optical system that projects modulated light emitted from said optical modulation device, said second lens array and said polarizing conversion element array having substantially rectangular outer shapes,
said jig including:
a frame having a substantially rectangular first open surface on one side of said frame and a substantially rectangular second open surface on another side of said frame, and having a hollow section inside said frame;
a projection provided close to said first open surface;
a step portion provided on an inner peripheral surface of said frame that divides said hollow section into a relatively small first storage section close to said first open surface and a relatively large second storage section close to said second open surface;
fixing members that detachably fix said second lens array, said polarizing conversion element array, and said frame in a state where said lens array and said polarizing conversion element array are stored in said frame; and
said second lens array and said polarizing conversion element array being stored in said first storage section and said second storage section in a predetermined order from said second open surface.

15. The projector as claimed in claim 14, further comprising a light-shielding plate stored in said frame inserted between said second lens array and said polarizing conversion element array that shields at least a part of a light incident surface of said polarizing conversion element array.

16. The projector as claimed in claim 14, said polarizing conversion element array being divided into a first array unit and a second array unit, each having substantially a rectangular outer shape, and one of said first storage section and said second storage section in which said first array unit and said second array unit are stored including: positioning projections provided between said first array unit and said second array unit that define positions of said first array unit and said second array unit; and elastic members provided on opposing inner surfaces of said frame that press said first array unit and said second array unit onto said positioning projections, respectively.

17. The projector as claimed in claim 14, said polarizing conversion element array being divided into first array unit and second array unit, each having substantially a rectangular outer shape, one of said first storage section and said second storage section in which said first array unit and said second array unit are stored including positioning projections provided between said first array unit and said second array unit that define positions of said first array unit and said second array unit, and said first array unit and said second array unit being pressed onto said positioning projections by said fixing members.

18. The projector as claimed in claim 14, one of said first storage section and said second storage section in which said second lens array is stored including an elastic member provided on one inner surface of said frame that presses said second lens array onto an opposite inner surface of said frame.

19. A projector that projects an image, comprising:
a light source;
a first lens array having a plurality of small lenses;
an optical device including a second lens array having a plurality of small lenses; a polarizing conversion element array having a plurality of polarization separating films that separate light transmitted from said small lenses into two kinds of polarized light and a plurality of reflecting films that reflect one of said two kinds of polarized light separated by said polarization separating films, said polarizing conversion element array converting non-polarized light into one kind of linearly polarized light; and a jig that detachably unites said second lens array and said polarizing conversion element array;
a color light separating optical system that separates light emitted from said optical device into a plurality of color light;
a plurality of optical modulation devices that respectively modulate said plurality of color light based on an image signal;
a color light synthesizing section that synthesizes modulated light emitted from said plurality of optical modulation devices; and
a projection optical system that projects synthesized light emitted from said color light synthesizing section, said second lens array and said polarizing conversion element array having substantially rectangular outer shapes,
said jig including:

a frame having a substantially rectangular first open surface on one side of said frame and a substantially rectangular second open surface on another side of said frame, and having a hollow section inside said frame;

a partitioning projection provided on an inner peripheral surface of said frame that partitions said hollow section into a first storage section communicating with said first open surface and second storage section communicating with said second open surface;

fixing members that detachably fix said second lens array, said polarizing conversion element array, and said frame in a state where said lens array and said polarizing conversion element array are stored in said frame; and said second lens array being stored in said first storage section from said first open surface and said polarizing conversion element array being stored in said second storage section from said second open surface.

20. The projector as claimed in claim 19, further comprising a light-shielding plate stored in said frame inserted between said second lens array and said polarizing conversion element array that shields at least a part of a light incident surface of said polarizing conversion element array.

21. The projector as claimed in claim 19, said polarizing conversion element array being divided into a first array unit and a second array unit, each having substantially a rectangular outer shape, and one of said first storage section and said second storage section in which said first array unit and said second array unit are stored including: positioning projections provided between said first array unit and said second array unit that define positions of said first array unit and said second array unit; and elastic members provided on opposing inner surfaces of said frame that press said first array unit and said second array unit onto said positioning projections, respectively.

22. The projector as claimed in claim 19, one of said first storage section and said second storage section in which said second lens array is stored including an elastic member provided on one inner surface of said frame that presses said second lens array onto an opposite inner surface of said frame.

23. A projector that projects an image, comprising:

a light source;

a first lens array having a plurality of small lenses;

an optical device including a second lens array having a plurality of small lenses; a polarizing conversion element array having a plurality of polarization separating films that separate light transmitted from said small lenses into two kinds of polarized light and a plurality of reflecting films that reflect one of said two kinds of polarized light separated by said polarization separating films, said polarizing conversion element array converting non-polarized light into one kind of linearly polarized light; and a jig that detachably unites said second lens array and said polarizing conversion element array;

a color light separating optical system that separates light emitted from said optical device into a plurality of color light;

a plurality of optical modulation devices that respectively modulate said plurality of color light based on an image signal;

a color light synthesizing section that synthesizes modulated light emitted from said plurality of optical modulation devices; and a projection optical system that projects synthesized light emitted from said color light synthesizing section, said second lens array and said polarizing conversion element array having substantially rectangular outer shapes, said jig including:

a frame having a substantially rectangular first open surface on one side of said frame and a substantially rectangular second open surface on another side of said frame, and having a hollow section inside said frame;

a projection provided close to said first open surface;

a step portion provided on an inner peripheral surface of said frame that divides said hollow section into a relatively small first storage section close to said first open surface and a relatively large second storage section close to said second open surface;

fixing members that detachably fix said second lens array, said polarizing conversion element array, and said frame in a state where said lens array and said polarizing conversion element array are stored in said frame; and said second lens array and said polarizing conversion element array being stored in said first storage section and said second storage section in a predetermined order from said second open surface.

24. The projector as claimed in claim 23, further comprising a light-shielding plate stored in said frame inserted between said second lens array and said polarizing conversion element array that shields at least a part of a light incident surface of said polarizing conversion element array.

25. The projector as claimed in claim 23, said polarizing conversion element array being divided into a first array unit and a second array unit, each having substantially a rectangular outer shape, and one of said first storage section and said second storage section in which said first array unit and said second array unit are stored including: positioning projections provided between said first array unit and said second array unit that define positions of said first array unit and said second array unit; and elastic members provided on opposing inner surfaces of said frame that press said first array unit and said second array unit onto said positioning projections, respectively.

26. The projector as claimed in claim 23, said polarizing conversion element array being divided into first array unit and second array unit, each having substantially a rectangular outer shape, one of said first storage section and said second storage section in which said first array unit and said second array unit are stored including positioning projections provided between said first array unit and said second array unit that define positions of said first array unit and said second array unit, and said first array unit and said second array unit being pressed onto said positioning projections by said fixing members.

27. The projector as claimed in claim 23, one of said first storage section and said second storage section in which said second lens array is stored including an elastic member provided on one inner surface of said frame that presses said second lens array onto an opposite inner surface of said frame.

* * * * *